Figure 1:
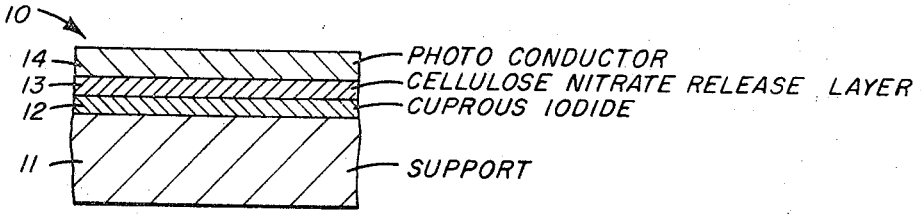
Figure 2:
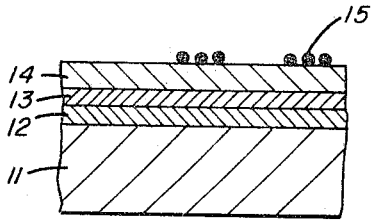
Figure 3:
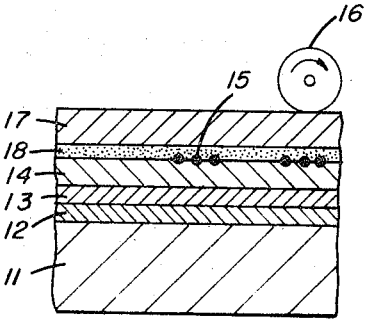
Figure 4:
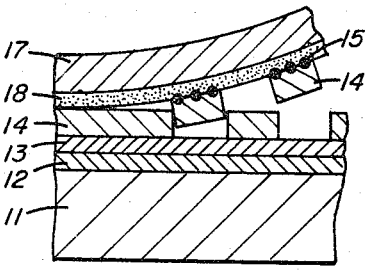

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 29, 1970

878 O.G. 1149

T878,022
SELECTIVE STRIPPING OF PHOTOCONDUCTIVE MATERIAL TO MAKE A PRINTING MASTER

William Trachtenberg, Kodak Park Works, Rochester, N.Y. 14650

Filed Mar. 24, 1970, Ser. No. 22,179
**Int. Cl. G03g *13/22***
U.S. Cl. 96—1
1 Sheet Drawing. 19 Pages Specification

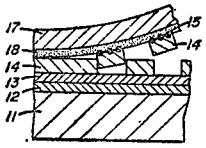

An image forming process whereby a particle image is formed xerographically on a photoconductive element which has a selectively separable layer of photoconductive material. After the particle image is formed on the photoconductive layer and permanently fused to said photoconductor, an adhesive transfer member is rolled onto said photoconductor while heat and pressure are applied. The transfer member and the photoconductive member are then separated. With this separation the xerographically formed particle image and the photoconductive coating immediately underlying said image adhere and are transferred to the transfer member thus forming complementary images on the respective surfaces. Also disclosed is a process in which the entire photoconductive layer, including the fixed toned image, is stripped from its support with the transfer sheet. This result is obtained because a release layer is used which forms a weaker bond between the photoconductive layer and its support than the bond formed by the transfer sheet with the fixed toner and the photoconductive layer. In the resulting product on the transfer sheet the toned image is overcoated and protected by the stripped photoconductive layer.

Sept. 29, 1970 W. TRACHTENBERG T878,022

SELECTIVE STRIPPING OF PHOTOCONDUCTIVE MATERIAL
TO MAKE A PRINTING MASTER
Filed March 24, 1970

WILLIAM TRACHTENBERG
INVENTOR.

BY Tom Hiatt

ATTORNEY